Patented Feb. 9, 1926.

1,572,533

UNITED STATES PATENT OFFICE.

HERMAN HEUSER, OF EVANSTON, ILLINOIS.

FOOD COMPOUND.

No Drawing.    Application filed August 11, 1921.   Serial No. 491,522.

*To all whom it may concern:*

Be it known that I, HERMAN HEUSER, a citizen of the United States, residing at 929 Sheridan Road, Evanston, in the county of Cook and State of Illinois, have invented a new and useful Improvement in Food Compounds, of which the following is a specification.

The present invention relates to food compounds and will be fully understood from the following description thereof.

In accordance with the present invention the curd, consisting chiefly of casein with greater or less proportions of butter fat or substituted fats, produced from milk by the customary methods for the manufacture of cheese, is admixed with yeast substance and the mixture is subjected to curing action, for example, by the ordinary methods for curing cheese. The yeast substance employed may be ordinary brewer's yeast or compressed yeast, although dry yeast or yeast intermediate in moisture content between dry yeast and compressed yeast may be employed. Yeast cell contents broken down by mechanically rupturing the cells or by boiling may be employed. For the reasons hereinafter pointed out, it is preferred to use cell yeast containing not over 45% of moisture.

A food compound may be made in accordance with the present invention in the following manner:

Milk curd, well drained and firm and preferably made from pasteurized milk, is admixed with 10 to 20% by weight of dry live yeast, the yeast being preferably added gradually in powdered form while stirring the curd. Salt, say 1 to 2%, or coloring matter, or both may be added, if desired. The mixture, in a suitable cheese-cloth, may then be pressed to compact it and to reduce its moisture content. The pressure is continued for 1 to 2 days and may, if desired, be gradually increased during the period to 500 to 750 lbs. The moisture content is suitably reduced to 30 to 45%. The pressed curd mixture will already have a pronounced cheese-like flavor by reason of ripening produced by the enzymes of the yeast. The further curing of the cheese may be carried out in a properly humidified room, preferably at a low temperature, say 40 to 55° F. If it is desired to ripen the cheese without the aid of the moulds and bacteria with which it becomes inoculated on curing in the open air, it may be covered with paraffin before being placed in the curing room. The enzymes of the yeast then remain effective in curing the cheese. The presence of the yeast materially accelerates the ripening of the cheese, and also produces improved and characteristic flavors therein.

The presence of the yeast substance materially alters the nature of the curing or ripening process. The yeast, in the form of live cells or cell substance liberated by mechanical rupture, supplies highly active proteolytic enzymes which exert their activity in autolysis of the yeast substance as well as in proteolysis of the curd. The tendency to autolysis of the yeast exists with the yeast substance having a moisture content greater than 25% (dry yeast, as used herein, indicating yeast containing less than this). With a moisture content over 30 to 45% autolysis becomes very active, and great care must be taken to avoid the presence of putrefactive bacteria. The yeast substance, aside from the effect of its enzymes, profoundly affect the growth of the curing or ripening organisms and the flavors produced thereby, by reason of the character of addtional proteid matter supplied. When the yeast enzymes are absent, as when boiled yeast is used, proteolysis may be aided, for example, by the use of pepsin.

I claim:

1. The method of preparing a food compound of the nature of cheese which comprises admixing fermentation yeast substance with curd and ripening the mixture.

2. The method of preparing a food compound of the nature of cheese which comprises mixing live cell fermentation yeast with curd and ripening the mixture.

3. The method of preparing a food compound of the nature of cheese which comprises mixing live cell fermentation yeast with curd, reducing the mixture content of the mixture to 30 to 45% and ripening it.

4. The method of preparing a food compound of the nature of cheese which comprises mixing live cell fermentation yeast with curd, reducing the moisture content of the mixture to 30 to 45% and ripening the mixture while excluding air.

HERMAN HEUSER.